Patented Apr. 16, 1946

2,398,668

UNITED STATES PATENT OFFICE 2,398,668

MODIFIED ROSIN ESTERS AND THE PROCESS OF MAKING SAME

John B. Rust, West Orange, N. J., assignor to Montclair Research Corporation, a corporation of New Jersey No Drawing. Application April 14, 1944, Serial No. 531,117

20 Claims. (Cl. 260—27)

The present invention relates to modified rosin esters which are particularly adapted for use in coating compositions.

It is an object of this invention to provide modified rosin esters which are hard and tough and compatible with nitrocellulose.

It is an object of this invention to provide modified rosin esters which are soluble in drying oils and which may be made heat-convertible on proper formulation.

It is a further object to provide modified natural resin esters which accelerate the bodying of drying oils.

Another object of this invention is to make high melting, tough, pale-colored modified rosin esters useful as components in varnishes.

Another object of the invention is to make substantially neutral, heat hardenable derivatives of rosin esters.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the invention.

The process of the present invention comprises reacting rosin esters, such as those consisting essentially of glyceryl abietate, pentaerythrityl abietate, mannityl abietate and the like, with an unsaturated alcohol ester of an alpha unsaturated alpha beta dicarboxylic acid such as diallyl maleate, monoallyl maleate, dimethallyl maleate, monomethallyl maleate, dicrotyl maleate, monocrotyl maleate, dipropargyl maleate, monopropargyl maleate, dibutenyl maleate, monobutenyl maleate, and the like, or the above alcohol esters of fumaric, citraconic, itaconic, acetylene dicarboxylic acid and the like, instead of maleic acid esters. The rosin ester is one which still contains the characteristic unsaturation of abietic acid or rosin acids. Mixed esters can also be used such as rosin-phthalic glyceride.

It has been found possible to coreact the rosin ester and allyl diester at a relatively low temperature of about 200°–220° C. until a preliminary reaction is over. This preliminary reaction appears to be in the form of a partial reaction of the allyl ester with rosin ester, followed by a partial polymerization of this reaction product and copolymerization with part of the allyl ester. I do not, however, wish to be limited by theory, the above statement being made by way of illustration only. After this preliminary reaction is over the temperature is raised to 250° C. or higher in order to effect further polymerization, and increase the softening point of the product to the desired degree. Although the above procedure is satisfactory and offers good control in the process of the present invention, the ingredients may be mixed and heated directly to 250° C. or higher, to about 300° C.

I may use very small amounts of unsaturated ester to modify the rosin esters such as about 1% or I may use more, such as 30% or more. When I use ester gum, I may use 10% of, for instance, diallyl maleate to obtain a hard resin having excellent properties in varnishes and lacquers. Using ester gum as an example again, I have found that when more than about 25% of diallyl maleate is used and the reaction is carried to its ultimate, then gelled resins result which are insoluble, or only slightly soluble in solvents but which may be swollen to some extent depending upon the amount of combined diallyl maleate. The greater the amount of diallyl maleate, the harder are the resins and the less swollen are the gelled materials.

In another embodiment of the present invention a mono-unsaturated ester, such as monoallyl maleate, is heated with a rosin ester such as glyceryl diabietate or other polyhydric alcohol ester formed from an excess of polyhydric alcohol, to give the interester, interreaction product. In this way a substantially neutral interesterified product may be made which contains less unsaturated alcohol than does the diunsaturated ester-modified rosin ester. In some cases the latter procedure is preferred since only a mono-unsaturated ester is employed. Such monounsaturated esters are easily prepared by mixing molecularly equivalent amounts of unsaturated alcohol and unsaturated dibasic acid anhydride and heating for a short time to obtain the acid ester.

I have also found that it is possible to copolymerize the products of the present invention with polymerizable compounds such as styrene, methyl methacrylate, ethyl acrylate, vinyl acetate, indene, and the like. Thus I may first carry out a preliminary reaction between, for instance, ester gum and diallyl maleate and then copolymerize with, for instance, styrene. Such copolymer resins are very useful in making varnishes with drying oils and making lacquers with nitrocellulose, or other cellulose derivative.

The resins of the present invention are preferably made without polymerization catalysts.

However, the use of catalysts speeds up initial polymerization if it is desired to effect such reaction and also accelerates the final polymerization.

The modified resins of the present invention may be put to a variety of uses, as for instance in formulations of lacquers with nitrocellulose, varnishes with drying oils, etc. It is a particular object of this invention to produce oil-reactive heat-advancing resins by the modification of rosin esters with unsaturated esters, capable of continued polymerization when they are heated with drying oils in the usual practice of making varnishes. The resins of the present invention may also be blended with other resins such as urea-formaldehyde resins, phenol-aldehyde resins, melamine-formaldehyde resins, vinyl resins, methyl methacrylate resins, acrylate resins, cellulose derivatives, polyvinyl alcohol, vinylidene chloride resins, and the like.

The following examples are given to illustrate the process and products of the present invention. All proportions are in parts by weight.

*Example 1.*—4500 parts of ester gum consisting essentially of glyceryl abietate and 500 parts of diallyl maleate were heated together in a reactor containing a mechanical stirrer, thermometer, and reflux condenser. The resin and allyl ester were heated to 200° C. and thereafter as follows:

200°–220° C. for 2 hours
230°–240° C. for 5 hours
240°–260° C. for 3 hours
260°–300° C. for 3 hours A light colored, brittle resin was obtained which was harder and tougher than ester gum. It possessed a "ball and ring" softening point of 114° C. and an acid number of 10.6.

Forty parts of a drying oil (e. g., a linseed oil product wherein a certain amount of conjugated unsaturation has been produced such as that known as Conjulin) was heated to 275° C. and 20 parts of the above resin was added. The resin dissolved and the temperature was held at 235°-240° C. until a drop placed on a glass plate and cooled could be drawn out into a string 15-18 inches long. The base was thinned with 60 parts of mineral spirits to which 0.5% Pb and 0.05% Co (as naphthenate) was added. The resulting varnish was clear and light-colored. It dried dust-free in 1 hour and hard in 8 hours. After 48 hours the film showed a Sward hardness of 43 and withstood immersion in water for 48 hours.

The resin was also used in a lacquer of the following formula:

| | Percent |
|---|---|
| Nitrocellulose | 8.33 |
| Resin | 25.00 |
| Xylol | 15.00 |
| Butyl acetate | 30.00 |
| Amyl acetate | 16.67 |
| Ethyl acetate | 2.50 |
| Octyl alcohol | 2.50 |

The lacquer gave a clear film which after drying for 1 hour showed a Sward hardness of 11, and after 48 hours, 51. Ester gum used in the same formula showed a Sward hardness after 1 hour of 7 and after 48 hours, 40.

Allyl ester-modified ester gum resins such as the above are soluble in esters, ketones, hydrocarbons, chlorinated hydrocarbons, glycol ethers, nitropropane, and alcohols such as butanol; insoluble in ethyl alcohol and ethylene glycol.

*Example 2.*—4000 parts of ester gum and 1000 parts of diallyl maleate were heated together in a reactor equipped with a thermometer, condenser and a mechanical agitator, to 200° C. over a period of 1 hour. Thereafter heating was continued as follows:

200°–220° C. for 2 hours
220°–240° C. for 5 hours
240°–260° C. for 3 hours

This resin, at room temperature, was light in color and in the latter stages of heating foamed considerably and was very viscous. The resin possessed a softening point of 118° C. and an acid number of 9.4.

The resin was completely saponified by heating with concentrated sodium hydroxide solution and the solution of the saponified material was acidified with acetic acid. The precipitate was filtered and washed to remove all water-soluble substances and dried. The acid number was 158. On heating at 250° C. for 2 hours the acid number was 41.

*Example 3.*—3500 parts of ester gum and 1500 parts of diallyl maleate were heated together in a reactor equipped with a thermometer, condenser and a mechanical stirrer, to 200° C. over a period of 1 hour. Thereafter heating was continued as follows:

200°–220° C. for 2 hours
220°–240° C. for 5 hours
240°–260° C. for 1 hour

During the last hour of heating this resin foamed considerably and the molten mass could be pulled into long strings. Additional heating at 240°–260° C. of a duplicate formulation yielded an infusible, oil-insoluble resin which was only partially soluble in the usual solvents. The soluble resin possessed a softening point of 104° C. and an acid number of 8.5.

*Example 4.*—100 parts of ester gum and 66.7 parts of diallyl maleate were heated together in a three-neck flask equipped with a thermometer, condenser, and a mechanical stirrer to 200° C. over a period of 1 hour. Thereafter heating was continued as follows:

200°–220° C. for 5 hours
220°–230° C. for 2½ hours

A pale-colored, hard resin was obtained. It possessed a softening point of 114° C. and an acid number of 5.9.

*Example 5.*—125 parts of pentaerythrityl abietate and 31.25 parts of diallyl maleate were heated together to 200° C. in 1 hour in a flask equipped with a thermometer, condenser and a mechanical stirrer. Thereafter heating was continued as follows:

200°–230° C. for ½ hour
230° C. up to 260° C. for 9½ hours

A pale-colored, hard, brittle resin was obtained. This resin possessed a softening point of 120° C. and an acid number of 14.7.

*Example 6.*—160 parts of pentaerythrityl abietate and 40 parts of diallyl fumarate were heated together in a reactor equipped with a thermometer, condenser, and a mechanical agitator, slowly to 200° C. over a period of 1 hour. Thereafter heating was continued as follows:

200°–220° C. for 3 hours
220°–250° C. for 4 hours

An extremely light-colored, hard, brittle resin was obtained having a softening point of 118° C. and an acid number of 16.1.

*Example 7.*—140 parts of ester gum and 60 parts of diallyl fumarate were heated together in a flask equipped with a thermometer, condenser, and a mechanical stirrer. The reactants were heated to 200° C. gradually and thereafter heating was continued as follows:

200° C.–220° C. 3 hours
220° C.–230° C. 3½ hours

An extremely pale-colored resin was obtained. It possessed a softening point of 119° C. and an acid number of 30.8.

*Example 8.*—160 parts of ester gum and 40 parts of diallyl chloromaleate were heated together in a flask equipped with a thermometer, condenser, and stirrer. The reactants were heated to 200° C. in 1 hour. Thereafter heating was continued as follows:

200°–220° C. for 2 hours
220°–240° C. for 2 hours
240°–260° C. for 6 hours

A somewhat darker colored resin was obtained which possessed a softening point of 114° C. and an acid number of 34.4.

*Example 9.*—160 parts of ester gum and 40 parts of diallyl itaconate were heated together in a flask equipped with a condenser, thermometer, and a stirrer. The reactants were heated to 200° C. in 1 hour. Thereafter heating was continued as follows:

200°–220° C. for 2 hours
220°–240° C. for 2 hours
240°–260° C. for 6 hours

A clear, fairly light-colored resin was obtained which possessed a softening point of 110° C. and an acid number of 10.

*Example 10.*—160 parts of ester gum and 40 parts of diallyl citraconate were heated together in a three-neck flask equipped with a stirrer, condenser, and thermometer. The reactants were heated to 200° C. over a period of 1 hour and thereafter as follows:

200°–220° C. 2 hours
240°–260° C. 6 hours

A hard, brittle resin of fair color was obtained. The resin possessed an acid number of 19.4 and a softening point of 112° C.

The following examples are used to illustrate another process of preparing the resin of the present invention. The process consists of esterifying a rosin polyhydroxy compound containing one or more free hydroxyl groups, then completing esterification with, for instance, a monoallyl maleate ester.

*Example 11.*—711.6 parts of WW rosin (2 moles) and 95.15 parts of glycerol (1 mole) were heated together at 234°–255° C. for 2 hours. 613.8 parts of the above resin glyceride ester and 128.7 parts of monoallyl maleate were heated together slowly to 200° C. in 1 hour. Heating was then continued at 200° C.–250° C. for 4 hours. A light-colored, hard, brittle resin was obtained which possessed a softening point of 115° C. and an acid number of 37.

*Example 12.*—450 parts of WW rosin (1½ moles) and 66.5 parts of pentaerythritol (½ mole) were heated together at 150°–250° C. for 2 hours. 183.5 parts of the above rosin pentaerythritol ester and 29.25 parts of monoallyl maleate were heated together slowly to 200° C. and heated thereafter as follows:

200°–230° C. for 1¾ hours
230°–250° C. for 2 hours

An extremely light-colored resin was obtained which possessed a softening point of 126° C. and an acid number of 43.

*Example 13.*—270 parts of rosin (.9 mole) and 36.3 parts of trihydroxymethyl-amino-methane (.5 mole) were heated together at 200°–250° C. for 2 hours. 181.2 parts of the above rosin ester and 29.25 parts of monoallyl maleate were heated together at 200°–250° C. for 1½ hours. A hard, brittle, light-colored resin was obtained which possessed an acid number of 18.5 and a softening point of 128° C.

*Example 14.*—200 parts of rosin (.66 mole) and 30.7 parts of glycerol (.33 mole) were heated together at 200°–260° C. over a period of 4 hours. 56.6 parts of monoallyl citraconate were then added and heating continued at 200°–240° C. for 6 hours. A pale-colored, brittle resin was obtained which possessed an acid number of 27.2 and a softening point of 102° C.

*Example 15.*—38 parts of ester gum were mixed with 15 parts of diallyl maleate and heated to 250°–280° C. until the solution had increased considerably in viscosity. The above product had a softening point of 93° C. The ester gum used possessed a softening point of 66° C.

*Example 16.*—30 parts of ester gum were mixed with 15 parts of diallyl maleate at 200°–220° C. for 1 hour, then at 280°–290° C. for 1 hour. The mixture slowly increased in viscosity and finally set up to an infusible gel. The gel was insoluble in a solvent composed of acetone, benzene, ethyl acetate and isopropanol. The resin swelled and broke up but did not dissolve.

*Example 17.*—187.6 parts of ester gum, 9.2 parts of glycerol and 51 parts of monomethallyl maleate were mixed and heated at 200° C. for 1 hour, then at 200°–250° C. until a light-colored, hard, tough resin was secured. This resin possessed a softening point of 103° C. and an acid number of 27.2.

It has been proposed to heat ester gum and diallyl maleate in the presence of benzoyl peroxide as a polymerization catalyst. For example, when 75 parts diallyl maleate, 25 parts ester gum and 10 parts benzoyl peroxide are mixed and the solution poured as a film and heated 1 hour at 250° F., it forms a hard, non-thermoplastic film. Likewise, when the solution is heated in a flask at 250° F. it rapidly forms a spongy mass. This is not a reaction product of ester gum and allyl maleate, but, as stated, it consists of ester gum dispersed in polymerized diallyl maleate since unchanged ester gum can be extracted from the mass by treating it with an ester gum solvent (e. g., benzene), which leaves polymerized diallyl maleate undissolved. No interreaction product of diallyl maleate and ester gum is formed under these conditions since the allyl maleate is polymerized and the ester gum remains distributed throughout the mass.

The presence of unchanged rosin ester in a composition is easily determined by the Storch-Morawski test and in this connection it may be noted that a gelled product obtained by polymerizing diallyl maleate in the presence of ester gum shows a positive test for free rosin ester, whereas an interreaction product of ester gum and diallyl maleate shows a negative test.

The products of the present invention comprise, therefore, soluble resinous interreaction products of a rosin or abietic acid ester, preferably a polyhydric alcohol ester, and an unsaturated dicarboxylic acid allyl ester. The process consists in heating the rosin ester and allyl ester under conditions to obtain reaction between the two (i. e., at between 200° C. and about 300° C.), followed by further heating to cause polymerization of the reaction product, and polymerization and copolymerization of the allyl ester in those cases where an excess of allyl maleate is present. The allyl ester is an ester of allyl alcohol (or a substituted allyl alcohol such as methallyl, chloroallyl, crotonyl, etc.) and an alpha-beta unsaturated dicarboxylic acid, that is, an unsaturated dicarboxylic acid wherein the carboxyl groups are attached to adjacent carbon atoms and at least one is connected to an unsaturated carbon atom.

The products of this invention when hydrolyzed yield a water-insoluble product, the acid number of which is lowered on heating. That is, when the resinous product is saponified by alkali and the saponification solution acidified, a water-insoluble hydrolytic product is obtained which apparently consists of acids and hydroxy acids, such bodies being a result of an addition reaction between the double bonds of the abietic part of the rosin ester and the double bonds of the allyl ester, during the production of the resin. Heating of the water-insoluble hydrolytic product causes esterification and lowering of the acid number. The resins herein described are therefore characterized in that the water-insoluble hydrolytic products thereof, when heated, are reduced in acid number.

I claim:

1. The process of making a soluble resinous reaction product which comprises heating, at between 200° and about 300° C., an abietic acid ester and an allyl ester of an alpha unsaturated alpha beta dicarboxylic acid.

2. The process of making a soluble resinous reaction product which comprises heating, at between 200° C. and about 300° C., a rosin-polyhydric alcohol ester and an allyl ester of an alpha unsaturated alpha beta dicarboxylic acid.

3. The process of making a soluble resinous reaction product which comprises heating, at between 200° C. and about 300° C., a rosin polyhydric alcohol ester formed from equivalent amounts of rosin acids and polyhydric alcohol, and a diallyl ester of an alpha unsaturated alpha beta dicarboxylic acid.

4. The process of making a soluble, substantially neutral, resinous reaction product which comprises heating, at between 200° C. and about 300° C., a rosin-polyhydric alcohol ester formed from an excess of polyhydric alcohol, and a monoallyl alcohol ester of an alpha unsaturated alpha beta dicarboxylic acid.

5. The process of claim 3 where the allyl ester is diallyl maleate.

6. The process of claim 3 where the allyl ester is diallyl fumarate.

7. The process of claim 4 where the allyl ester is monoallyl maleate.

8. The process of making a soluble resinous reaction product which comprises heating rosin-glyceride and diallyl maleate at between 200° and 300° C.

9. The process of making a soluble resinous reaction product which comprises heating rosin-glyceride and diallyl fumarate at between 200° and 300°.

10. The process of making a soluble resinous reaction product which comprises heating glycerol diabietate and monoallyl maleate at between 200° and 300° C.

11. A modified rosin ester adapted for use in coating compositions which comprises a heat-reaction product of a rosin ester containing conjugated double bonds in the abietate portion and an allyl ester of an alpha unsaturated alpha beta dicarboxylic acid, said product yielding a water-insoluble hydrolytic product being obtained by heating the rosin ester and the allyl ester at between 200° and 300° C. and, after saponification, whose acid number is lowered on heating.

12. A soluble resinous composition comprising a reaction product obtained by heating a rosin-polyhydric alcohol ester and an allyl-alpha unsaturated alpha beta dicarboxylic acid ester at between 200° and 300° C.

13. A soluble resinous composition comprising a reaction product obtained by heating a rosin-polyhydric alcohol ester formed from equivalent amounts of rosin acids and polyhydric alcohol, and a diallyl ester of an alpha unsaturated alpha beta dicarboxylic acid at between 200° and 300° C.

14. A soluble resinous composition comprising a reaction product obtained by heating a rosin-polyhydric alcohol ester formed with an excess of polyhydric alcohol, and a monoallyl ester of an alpha unsaturated alpha beta dicarboxylic acid at between 200° and 300° C.

15. A soluble resinous composition comprising the heat-reaction product, at between 200° and 300° C., of a rosin-polyhydric alcohol ester and diallyl maleate.

16. A soluble resinous composition comprising the heat-reaction product, at between 200° and 300° C., of a rosin-polyhydric alcohol ester and diallyl fumarate.

17. A soluble resinous composition comprising the heat-reaction product, at between 200° and 300° C., of a rosin-polyhydric alcohol ester and monoallyl maleate.

18. A soluble resinous composition comprising the heat-reaction product, at between 200° and 300° C., of rosin-glyceride and diallyl maleate.

19. A soluble resinous composition comprising the heat-reaction product, at between 200° and 300° C., of rosin-glyceride and diallyl fumarate.

20. A soluble resinous composition comprising the heat-reaction product, at between 200° and 300° C., of glycerol diabietate and monoallyl maleate.

JOHN B. RUST.

Certificate of Correction

Patent No. 2,398,668.                                                                April 16, 1946.

JOHN B. RUST

It is hereby certified that error appears in the printed specification of the above numbered patent requiring correction as follows: Page 4, second column, lines 18, 19 and 20, claim 11, strike out the words "being obtained by heating the rosin ester and the allyl ester at between 200° and 300° C. and" and insert the same before "yielding", line 17, same claim; and that the said Letters Patent should be read with this correction therein that the same may conform to the record of the case in the Patent Office.

Signed and sealed this 2d day of July, A. D. 1946.

[SEAL]

LESLIE FRAZER,
*First Assistant Commissioner of Patents.*